United States Patent
Dimou et al.

(10) Patent No.: US 9,155,010 B2
(45) Date of Patent: Oct. 6, 2015

(54) METHODS AND ARRANGEMENTS FOR HANDOVER

(75) Inventors: Konstantinos Dimou, Tungelsta (SE); Erik Dahlman, Bromma (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 677 days.

(21) Appl. No.: 13/148,553

(22) PCT Filed: Jun. 26, 2009

(86) PCT No.: PCT/SE2009/050817
§ 371 (c)(1),
(2), (4) Date: Aug. 9, 2011

(87) PCT Pub. No.: WO2010/090568
PCT Pub. Date: Aug. 12, 2010

(65) Prior Publication Data
US 2011/0310852 A1  Dec. 22, 2011

Related U.S. Application Data

(60) Provisional application No. 61/151,097, filed on Feb. 9, 2009.

(51) Int. Cl.
*H04W 36/08* (2009.01)
(52) U.S. Cl.
CPC ..................................... *H04W 36/08* (2013.01)
(58) Field of Classification Search
None
See application file for complete search history.

(56) References Cited

U.S. PATENT DOCUMENTS

| | | | |
|---|---|---|---|
| 5,239,667 A * | 8/1993 | Kanai | 455/10 |
| 2004/0037249 A1 | 2/2004 | Chae | |
| 2006/0094432 A1 | 5/2006 | Chang et al. | |
| 2007/0091854 A1 * | 4/2007 | Sinnarajah et al. | 370/335 |
| 2007/0099617 A1 | 5/2007 | Sipila | |
| 2007/0121521 A1 * | 5/2007 | D'Amico et al. | 370/252 |
| 2008/0014943 A1 | 1/2008 | Ahn | |
| 2008/0318578 A1 * | 12/2008 | Worrall | 455/437 |
| 2009/0170510 A1 * | 7/2009 | Kim | 455/434 |
| 2010/0124928 A1 * | 5/2010 | Ergen et al. | 455/436 |
| 2010/0222055 A1 * | 9/2010 | Cho et al. | 455/434 |

FOREIGN PATENT DOCUMENTS

EP   1 971 176 A2    9/2008
WO  WO 2008/151325 A1   12/2008

* cited by examiner

*Primary Examiner* — Thai Nguyen
*Assistant Examiner* — Eric H Wang

(57) ABSTRACT

Methods and arrangements for autonomous handover are provided. In a step, a mobile terminal sends a measurement report to a first network node. In another step, the mobile terminal starts a timer for measuring a wait period. In a further step, the mobile terminal waits until the wait period has expired. In still another step, the mobile terminal measures a signal used for mobility evaluations from the first radio network node. In yet another step, the mobile terminal performs random access to the second radio network node, if appropriate. Furthermore, the first radio network node sends information about random access channel (RACH) characteristics. Moreover, the first radio network node may send the wait period to the mobile terminal. In another step, the first radio network node sends the terminal context to neighbouring radio network nodes.

11 Claims, 9 Drawing Sheets

METHODS AND ARRANGEMENTS FOR HANDOVER

This application claims the benefit of U.S. Provisional Application No. 61/151,097, filed Feb. 9, 2009, the disclosure of which is fully incorporated herein by reference.

TECHNICAL FIELD

The present invention relates to methods and arrangements for handover. In particular, the present invention relates to a method and arrangement in a mobile terminal for handover and a method and arrangement in a first radio network node for improving handover performance in terms of delay, when the mobile terminal performs handover in certain conditions.

BACKGROUND

The 3rd Generation Partnership Project (3GPP) Long Term Evolution (LTE) system has been designed to offer significantly higher data rates, higher system throughput, and lower latency for delay critical services than existing telecommunication systems. This improved performance has to be provided and guaranteed during various mobility conditions. For example, there is a requirement for mobility support with high performance up to speeds of 120 km/h. A further requirement is the uninterrupted provision of high data rates and services, often referred to as Guaranteed Bit Rate (GBR) services. Hence, handover (HO) and its performance during such conditions are of high importance.

In US2001055969, there is disclosed a method and apparatus for handoff to a rescue channel without the need to send and receive handoff control messages. The method provides coordination of the rescue procedure at the infrastructure and mobile station. In a step, the mobile transmitter is disabled followed by subsequent detection of signal loss and frame erasures at the serving cells. Further, the mobile transmitter is enabled followed by subsequent detection of signal by a rescue cell. Finally, the rescue cell channel transmitter is enabled followed by subsequent detection and reception of signal and frames by the mobile station. A disadvantage with this solution is that there is a too long delay before the mobile station may respond to bad channel conditions and, hence recover from signal loss.

SUMMARY

It is an object of the present invention to provide a mechanism for improving the performance within a wireless communication network in a handover scenario.

Further, the present solution aims at improving handover in challenging mobility scenarios, such as when the mobile terminal is located in an area with high buildings or when the mobile terminal is travelling at a high speed, by reducing the period of time for performing the handover. Such challenging mobility scenarios frequently lead to loss of signals involved in a handover procedure.

According to a first aspect, the object is achieved by a method in a mobile terminal for performing handover from a first radio network node to a second radio network node in a radio communication system. The radio communication system comprises the mobile terminal, the first radio network node and the second radio network node. The method comprises measuring a first signal evaluation value on a first signal received from the first radio network node. Also, the method comprises sending a measurement report comprising the first signal evaluation value to the first network node. Further, the method comprises the step of, in association with the moment of sending the measurement report, starting a timer for measuring a wait period. When the wait period has expired, measuring a second signal evaluation value on a second signal received from the first radio network node. In addition, the method comprises obtaining a signal evaluation value difference by subtracting the first signal evaluation value from the second signal evaluation value. Furthermore, the method also comprises comparing the obtained signal evaluation value difference with a threshold value. Additionally, if the signal evaluation value difference is smaller than the threshold value, the method comprises performing random access to the second radio network node.

According to a second aspect, the object is also achieved by an arrangement in a mobile terminal for performing handover from a first radio network node to a second radio network node in a radio communication system. The radio communication system comprises the mobile terminal, the first radio network node and the second radio network node. The arrangement comprises a first measurement unit. The first measurement unit is adapted to measure a first signal evaluation value on a first signal received from the first radio network node. Also, the arrangement comprises a sending unit. The sending unit is adapted to send a measurement report comprising the first signal evaluation value to the first network node. Furthermore, the arrangement comprises a timer. The timer is adapted to measure a wait period. In addition, the arrangement also comprises a second measurement unit. The second measurement unit is adapted to measure a second signal evaluation value on a second signal received from the first radio network node. In further addition, the arrangement comprises an obtaining unit. The obtaining unit is adapted to obtain a signal evaluation value difference by subtracting the first signal evaluation value from the second signal evaluation value. Also, the arrangement further comprises a comparison unit. The comparison unit is adapted to compare the obtained signal evaluation value difference with a predetermined threshold value. Further yet, the arrangement in addition comprises a random access performing unit. The random access performing unit is adapted to perform random access to the second radio network node.

According to a third aspect, the object is achieved by a method in a first radio network node for assisting a mobile terminal for performing handover from the first radio network node to a second radio network node in a radio communication system. The radio communication system comprises the mobile terminal, the first radio network node and the second radio network node. The method comprises sending radio signal related information to the mobile terminal. The radio signal related information comprises any of: random access channel characteristics, synchronization information, and/or cell information.

According to a fourth aspect, the object is also achieved by an arrangement in a first radio network node for assisting a mobile terminal for performing handover from the first radio network node to a second radio network node in a radio communication system. The radio communication system comprises the mobile terminal, the first radio network node and the second radio network node. The arrangement comprises a sender. The sender is adapted to send radio signal related information to the mobile terminal. The radio signal related information comprises any of: random access channel characteristics, synchronization information, and/or cell information.

Thanks to the introduction of wait period for awaiting acknowledgement of the measurement report, the mobile terminal resumes its action when the wait period has expired. Then, the mobile terminal performs random access to the second radio network node, the target radio network node. In this manner, it may be ascertained that the handover is begun within a reasonable time period as determined by the wait period. As a result, the above mentioned object is achieved.

In order for the present solution to work efficiently, i.e. to reduce delays during handover procedures in challenging mobility scenarios, the mobile terminal may be synchronized with the second radio network node. This is feasible when the radio communication system i.e. the cellular network is synchronized. In a non-synchronized network this is also feasible, if the terminal measures pilot symbols or reference signals from adjacent radio network nodes and hence the terminal is aware of the timing offset between the radio network nodes, which radio network nodes are sometimes referred to as cells. This synchronization is achieved during random access attempts. Moreover, the mobile terminal needs to obtain information about the Random Access Channel (RACH) on the second radio network node, i.e. a target radio base station, such as to avoid reading the broadcast channel of the target channel prior to performing random access to the second radio network node.

The present solution may be implemented in areas where challenging mobility scenarios may be expected. Consequently, it is appropriate to implement the present solution in urban areas with high buildings and/or areas with significantly large cells in which the mobile terminal is expected to move fast, such as areas covering high speed train railroads or infrastructure for other speedy vehicles.

Moreover, the present solution may be implemented in specific cells of a specified area. Hence, the radio network node that supports the present solution would broadcast information about the possibility of taking advantage of the waiting period for improving handover, typically cells where sudden drop of quality of a link to the first radio network node, or the serving radio base station, is expected.

An advantage of the present solution is that handover performance, in terms of reduced response time, may be improved as compared to prior art in the above mentioned scenarios. Moreover, the present solution provides for efficient usage of radio resources.

Further features of, and advantages with, the present invention will become apparent when studying the following description. Those skilled in the art realize that different features of the present invention may be combined to create embodiments other than those described in the following, without departing from the scope of the present invention.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
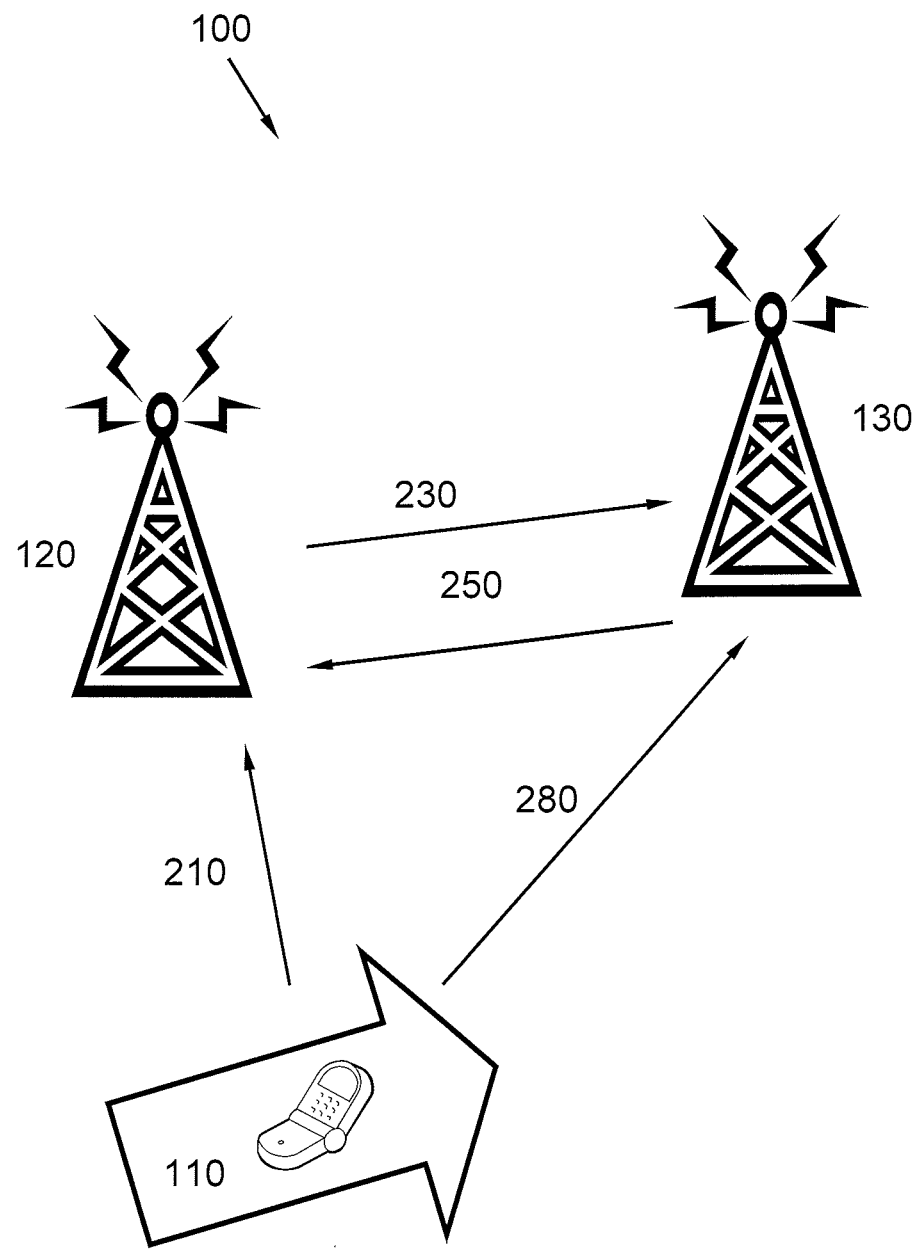
FIG. 1 is a schematic block diagram illustrating a radio communication system, in which the present solution may be implemented.

Throughout the following description similar reference numerals have been used to denote similar elements, parts, items or features, when applicable.

The present solution is defined as a method and an arrangement in a mobile terminal and a method and an arrangement in a first radio network node, which may be put into practice in the embodiments described below. The present solution may, however, be embodied in many different forms and may not be construed as limited to the embodiments set forth herein; rather, these embodiments are provided so that this disclosure will be thorough and complete, and will fully convey the scope of the present solution. It should be understood that there is no intent to limit the present methods, and arrangements to any of the particular forms disclosed, but on the contrary, the present methods and arrangements are to cover all modifications, equivalents, and alternatives falling within the scope of the present solution as defined by the claims.

The present methods and arrangements may, of course, be carried out in other ways than those specifically set forth herein without departing from essential characteristics of the solution. The present embodiments are to be considered in all respects as illustrative and not restrictive, and all changes coming within the meaning and equivalency range of the appended claims are intended to be embraced therein.

FIG. 1 shows a schematic exemplifying radio communication system 100, comprising a first and second radio network node 120, 130, such as e.g. a first and second eNB. The radio communication system 100 may be an LTE/SAE radio communication system, according to some embodiments. The radio communication system 100 is further configured to comprise a mobile terminal 110, which also may be referred to as a user equipment (UE), according to some embodiments. The mobile terminal 110 is served by the first radio network node 120, which thus also may be referred to as a serving node, or source node. The system 100 may optionally comprise further network nodes such as mobility management entities, home subscriber systems and the like, as is customary in a LTE/SAE communication system.

Thus, although two radio network nodes 120, 130 are illustrated in FIG. 1, it is to be understood that another configuration of radio network nodes 120, 130 may be comprised within the radio communication system 100, such as e.g. one, two, three, four, or another plurality of radio network nodes 120, 130.

Each of the radio network nodes 120, 130 may also be referred to as e.g. a base station, an access point, a Node B, an eNode B, a base transceiver station, Access Point Base Station, base station router, etc depending e.g. of the radio access technology used. However, in order to not unnecessarily complicate the understanding of the present methods and arrangements, the expression "radio network node" will be used consistently in this text for describing the radio network nodes 120, 130.

The mobile terminal 110, may be a user equipment (UE) such as e.g. a wireless communication terminal, a mobile cellular telephone, a Personal Digital Assistant (PDA), a laptop, a computer or any other kind of device capable of managing radio resources, adapted to communicate wirelessly with any of the radio network nodes 120, 130 within range.

The radio access technologies used for wireless communication may comprise technologies such as e.g. E-UTRAN, UTRAN, GSM, Enhanced Data rates for GSM Evolution (EDGE), General Packet Radio Service (GPRS), Code division multiple access (CDMA), Wideband Code Division Multiple Access (WCDMA), CDMA 2000, High Speed Downlink Packet Data Access (HSDPA), High Speed Uplink Packet Data Access (HSUPA), High Data Rate (HDR), Universal Mobile Telecommunications System (UMTS) etc, just to mention some few arbitrary and none limiting examples. However, the radio communication system 100 is in the subsequently described embodiments depicted as a LTE/SAE radio communication system.

Figure 2A:
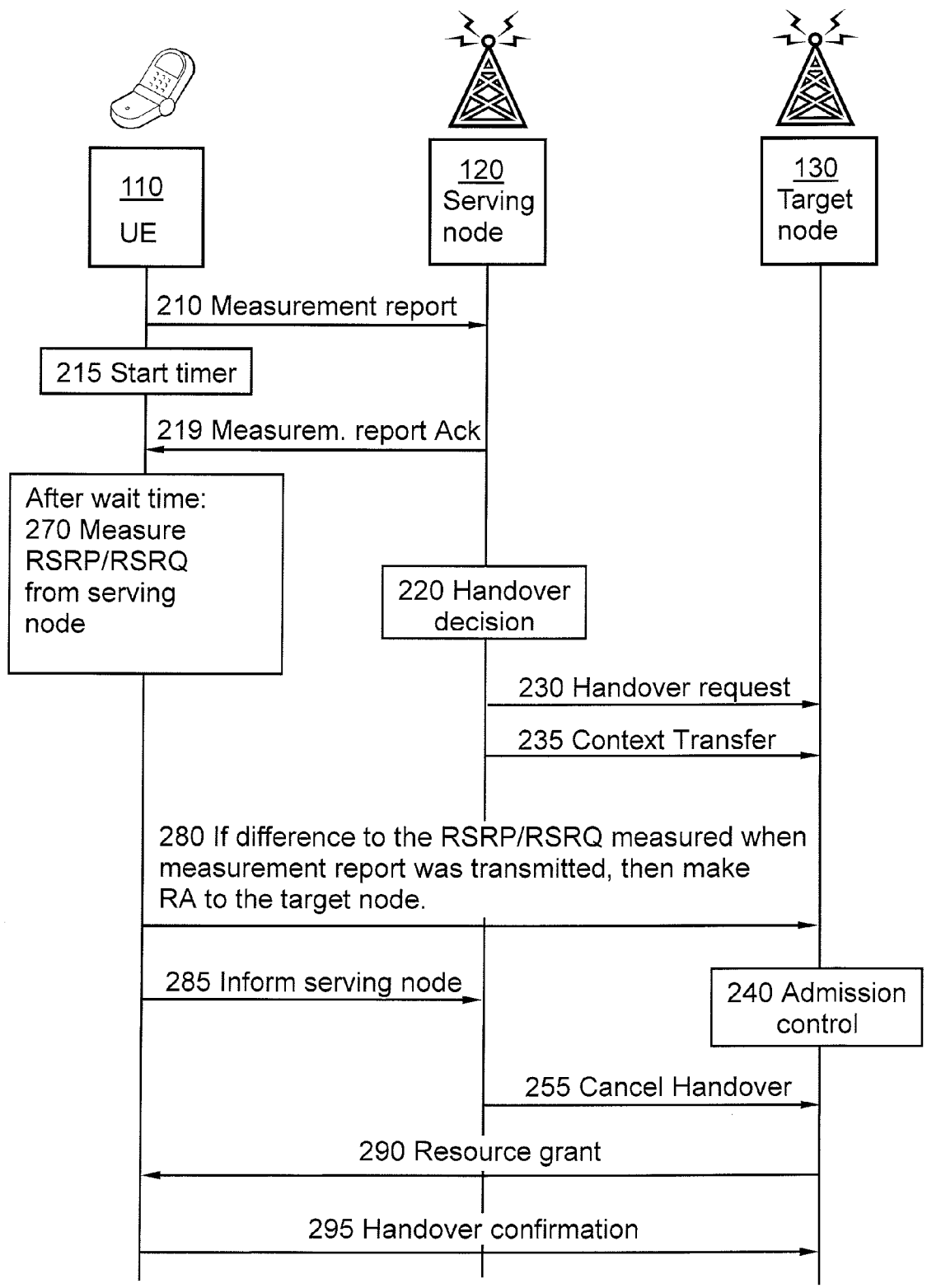
FIG. 2a is a combined flow chart and signalling scheme depicting an embodiment of a method for handover performed in the radio communication system.

Now with reference to FIG. 2a, there is illustrated a schematic, combined signalling and flow chart of an embodiment of a method for handover performed in the radio communication system 100 of FIG. 1. A handover from the first radio network node 120, or the serving radio network node, to the second radio network node 130, or the target radio network node, may comprise the following steps:

Step 210
In a step 210, the mobile terminal 110 may send a measurement report to the first radio network node 120.

Step 215
In a step 215, the mobile terminal 110 starts a timer, Td, for measuring a waiting period for waiting for acknowledgement of the measurement report to be received from the first radio network node 120. Optionally, this step is performed simultaneously to the step 210. Typical values for the timer Td are multiples of measurement periods, i.e. 1×66.6 ms, 2×66.6 ms, 1×50 ms, 2×50 ms, 1×40 ms, 2×40 ms, . . . n×40 ms etc. According to some embodiments, the timer Td may be set to 1 or 2 measurement periods.

In case the timer Td expires after receiving an acknowledgment for the measurement report by the first radio network node 120, such as the serving base station. Then, the mobile terminal 110 may send a scheduling request to the network, or the radio communication system 100, at a point in time at which the timer Td expires. The network 100 may be configured to be able to detect this point in time. In addition, the network 100 may know that the mobile terminal 110 supports the suggested feature. The network 100 may not know though, if the mobile terminal 110 has performed autonomous handover or not. Hence, the network 100 may allocate resources to the mobile terminal 110 for N times and if no data transmission takes place, the network notifies e.g. via X2 interface the second radio network node 130, such as a target radio base station, not to prepare a handover command for this specific mobile terminal 110. The first radio network node 120, such as a serving eNB, may forward the context of the mobile terminal 110 to adjacent or neighbouring radio network nodes 130, i.e. possible target radio base stations. In this case the network preferably does not transmit the handover command to the mobile terminal 110.

In case the timer Td expires before receiving an acknowledgement for the measurement report from the first radio network node 120, such as the serving base station, the mobile terminal 110 may stop re-transmitting the measurement report. Thereby, the mobile terminal 110 makes radio resources, used for sending the measurement report, available for other mobile terminals. Considering that the radio communication system 100 is aware of the fact that the mobile terminal 110 possibly may have left the cell, the radio communication system 100 may try to transmit N more uplink scheduling grants to the mobile terminal 110. In case nothing is received by the mobile terminal 110, then the radio communication system 100 may realize that the mobile terminal 110 has left the cell. Consequently, the radio communication system 100 may not transmit the handover command to this specific mobile terminal 110.

Step 219
In a step 219, a measurement report acknowledgement may be sent from the first node 120 to the mobile terminal 110, according to some embodiments.

Step 220
In a step 220, the first radio network node 120 may make a handover decision based on the measurement report.

Step 230
In a step 230, the first radio network node 120 may send a handover request to the second radio network node 130.

Step 235
In a step 235, the first radio network node 120 may transfer the terminal context to the second radio network node 130.

Step 240
In a step 240, the second radio network node 130 performs admission control in order to evaluate whether or not to acknowledge the received handover request.

Step 250
In a step 250, the second radio network node 130 may send a handover request acknowledgement as applicable in view of the admission control performed in the step 240.

Step 255
In a step 255, the first radio network node 120 may cancel the handover, according to some embodiments, by sending a cancel handover message to the second radio network node 130.

Step 270
In a step 270, the mobile terminal 110 measures Reference Signal Received Power (RSRP), or Reference Signal Received Quality (RSRQ) or any other quantity used for handover decisions, received from the first radio network node 120, if the waiting period Td has expired.

Step 280
In a step 280, the mobile terminal 110 may perform random access to the second radio network node 130, if the absolute difference between RSRP, or RSRQ of the measurement report and RSRP, or RSRQ measured in the step 270 is larger than a predetermined threshold value. This threshold may be determined as a value in dB. It may be determined while taking into account the handover hysteresis of the measurement reporting, i.e. handover hysteresis+threshold=3-6 dBs. In some embodiments, this value may be determined dynamically based on the handover hysteresis value and on the speed of the mobile terminal. The higher the speed, the higher this threshold value may be.

Thus, upon expiration of the timer td started in step 215: RSRP and RSRQ values may be compared according to some embodiments. If difference exists, notify the serving node 120 that autonomous handover is going to be attempted. Then, the mobile terminal 110 may initiate autonomous handover by transmitting random access to the target node 130.

Step 285
The mobile terminal 110 may inform the first radio network node 120, prior to performing the random access to the second radio network node 130, by sending a message.

Step 290
In a step 290, the second radio network node 130 may send a message to the mobile terminal 110, wherein the message indicates that the random access attempt has been granted, i.e. resources have been assigned to the mobile terminal 110.

Step 295

In a step 295, the mobile terminal 110 may send a handover confirmation message to the second radio network node 130.

Thus, according to some embodiments of the present solution, the first radio network node 120 may support use of a wait period for improving handover performance. The first radio network node 120 may send, or broadcast information about random access channel (RACH) characteristics, such as RACH periodicity and/or RACH preambles length, synchronization info, such as synchronization channel identification, and/or cell information, such as cell identification transmitted via the reference signals, on a broadcast channel to the mobile terminals 130 located in a cell of the first radio network node 120. In case some of this information, e.g. RACH characteristics, is the same or similar in the serving cell i.e. the first radio network node 120 as in its neighbours, such as the second radio network node 130, the serving cell i.e. the first radio network node 120 may indicate this in its broadcast channel. In this manner, the network 100 may cease to attempt to transmit a handover command to a mobile terminal 110, which has performed autonomous handover to another radio network node, such as the second radio network node 130. In other words, the handover procedure may be aborted by the first radio network node 120. The information sent to the mobile terminal 110 via the broadcast channel, in case of autonomous handover, or sent via the handover command in case of traditional network controlled handover, is used by the mobile terminal 110 for initiating communicating with the second radio network node 130, such as the target base station.

Figure 2B:
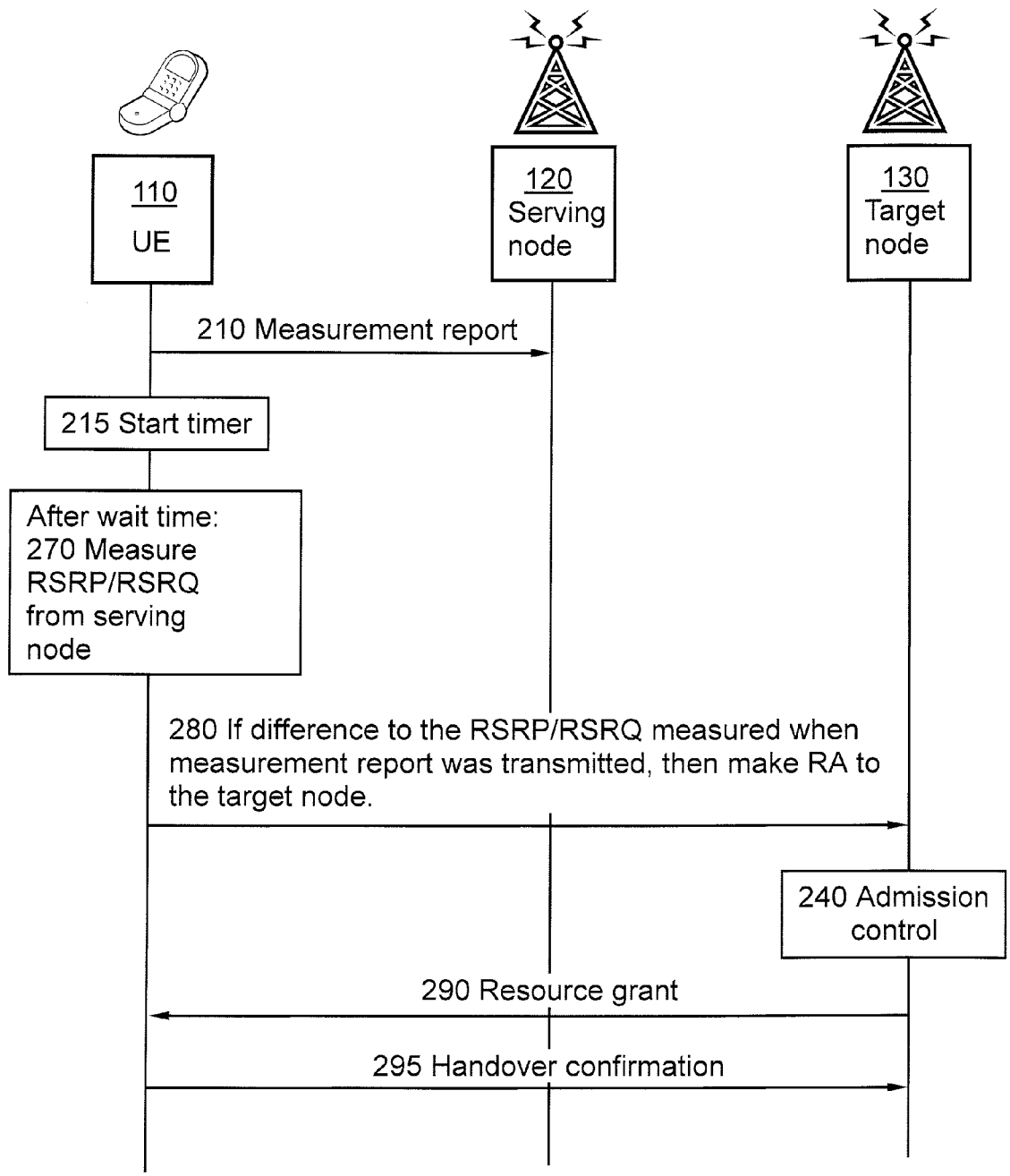
FIG. 2b is a combined flow chart and signalling scheme depicting an embodiment of a method for handover performed in the radio communication system.

In FIG. 2b, there is illustrated a schematic, combined signalling and flow chart of another embodiment of the method for handover performed in the radio communication system 100 of FIG. 1. A handover from the first radio network node 120, or the serving radio network node, to the second radio network node 130, or the target radio network node, may comprise the following steps, according to the illustrated embodiment.

Step 210

In a step 210, the mobile terminal 110 may send a measurement report to the first radio network node 120.

Step 215

In a step 215, the mobile terminal 110 starts a timer, Td, for measuring a waiting period for waiting for acknowledgement of the measurement report to be received from the first radio network node 120. Optionally, this step is performed simultaneously to the step 210. Typical values for the timer Td are multiples of measurement periods, i.e. 1×66.6 ms, 2×66.6 ms, etc. . . . , e.g. 1 or 2 measurement periods, according to some embodiments.

Step 270

In a step 270, the mobile terminal 110 may measure RSRP, or RSRQ from the first radio network node 120 if the waiting period has expired.

Step 280

In a step 280, the mobile terminal 110 may perform random access to the second radio network node 130, if a difference between RSRP, or RSRQ of the measurement report and RSRP, or RSRQ measured in the step 270 is larger than a predetermined threshold value. This threshold value may be determined as a value in dB. It may be determined while taking into account the handover hysteresis of the measurement reporting, i.e. handover hysteresis+threshold value=3-6 dBs. In some embodiments, this value may be determined dynamically based on the handover hysteresis value and on the speed of the mobile terminal 110. The higher the terminal speed is, the higher this threshold value may be, according to some embodiments.

Since the measurement report may not yet have been received by the first radio network node 120, when the mobile terminal 110 leaves the cell by performing autonomous handover, the first radio network node 120 is allocating resources to the mobile terminal 110, whereby the mobile terminal 110 retransmits the measurement report. In case, the mobile terminal 110 does not transmit the N time instants, the mobile terminal 110 has been allocated resources the first radio network node 120 may detect this lack of transmission. Upon detection of this lack of transmission, the network may realize that the mobile terminal 110 has left the cell. A little bit after the expiration of timer Td.

Step 240

In a step 240, the second radio network node 130 may perform admission control in order to evaluate whether or not to acknowledge the received handover request from the mobile terminal 110.

Step 290

In a step 290, the second radio network node 130 may send a message to the mobile terminal 110, wherein the message may indicate that the random access attempt has been granted, i.e. resources have been assigned to the mobile terminal 110.

Step 295

In a step 295, the mobile terminal 110 may send a handover confirmation message to the second radio network node 130.

In some embodiments of the method in the mobile terminal 110, the mobile terminal 110 may send a scheduling request to the first radio network node 120. In this manner the mobile terminal 110 may notify the radio communication system 100 that the mobile terminal 110 has decided to leave the first radio network node 120, because it has found out e.g. by measuring RSRP, RSRQ or the like, that it is more favourable to camp on the second radio network node 130. An advantage with sending a scheduling request is that this is the smallest amount of information that can be sent from the mobile terminal 110 to the first radio network node 120, whereby only a small amount of radio resource are needed. As a result, the radio communication system 100 may respond to the fact that the mobile terminal 110 has, or will, perform autonomous handover to the second radio network node 130, since when the radio communication system 100 does not receive a response to a schedule grant message, sent e.g. in response to the scheduling request, the radio communication system 100 may conclude that the mobile terminal 110 has, in fact, decided to perform autonomous handover to another radio network node, such as the second radio network node 130.

Figure 2C:
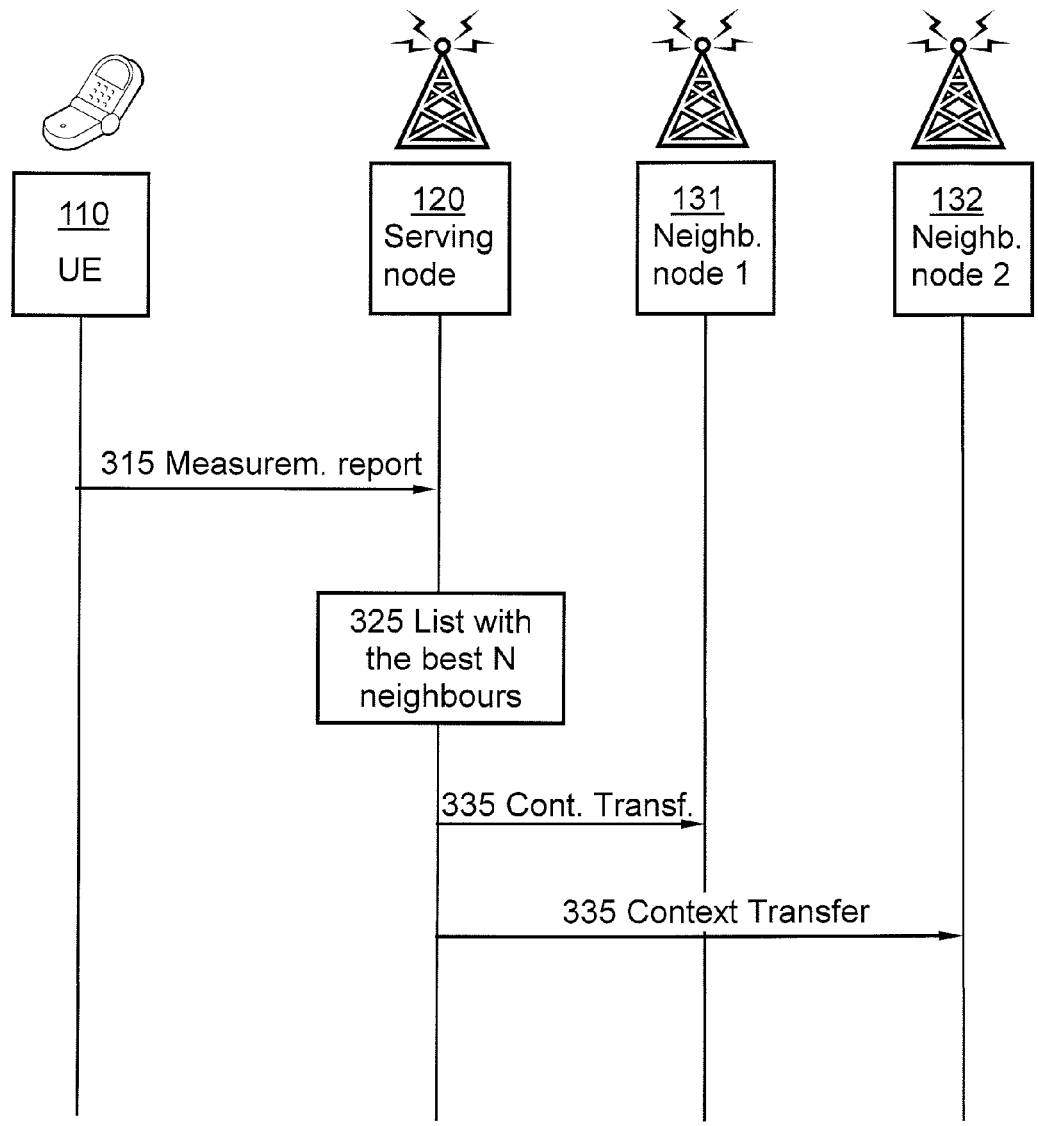
FIG. 2c is a combined flow chart and signalling scheme depicting an embodiment of a method for handover performed in the radio communication system.

In FIG. 2c, there is illustrated a schematic, combined signalling and flow chart of another embodiment of the method so as to support efficiently the handover performed in the radio communication system 100 of FIG. 1.

In some embodiments of the method, the mobile terminals 110 may be configured by the network 100 so as to report the list of the neighbour nodes 131 which the mobile terminal 110 receives with good quality and which neighbour nodes 131 might become potential target nodes during handover.

Step 315

In a step 315, the mobile terminal 110 may send a measurement report to the first radio network node 120, which is the serving node. This measurement report may be different from the measurement report 210 in the sense that it contains the list of the N strongest neighbour nodes 131. These neighbour nodes 131 might become target nodes later.

Step 325

In a step 325, the first radio network node 120 may form the list of the neighbour nodes 131 which can become target nodes later.

Step 335

In a step 335, the first radio network node 120 may forward i.e. transmit the terminal context to the neighbour nodes 131 being in the list formed at step 325.

Figure 3:
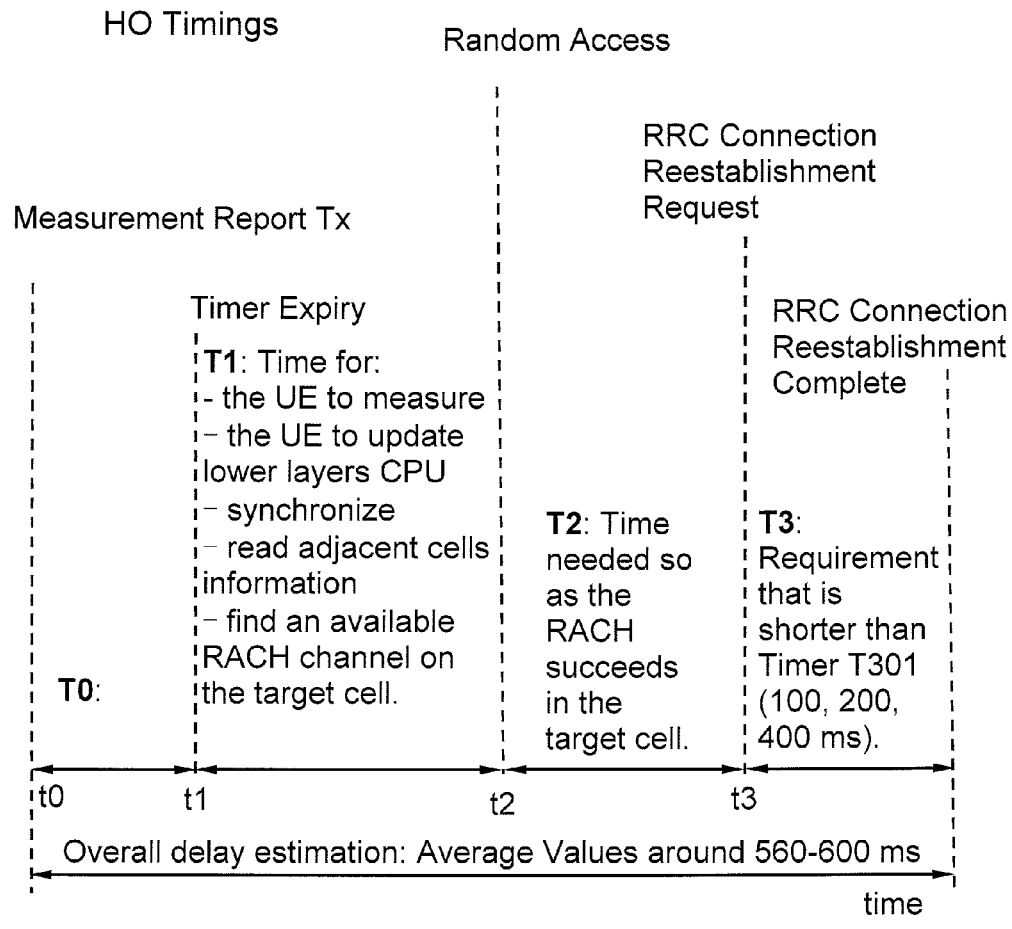
FIG. 3 is an illustration depicting handover timing for the proposed solution according to some embodiments.

Referring to FIG. 3, there is shown a timing diagram of handover timing in a radio communication system 100, in which the present solution has been implemented. In the FIG. 3, a period of time T_A denotes the overall delay estimation period, which on average may be for example between 560 to 600 ms. The period of time T_A comprises sub-periods of time, T0, T1, T2 and T3. The starting points in time of these sub-periods of time are denoted t0, t1, t2 and t3, respectively. At point in time t0, the mobile terminal 110 sends the measurement report to the first radio network node 120. At the point in time t1, the timer Td, which was started by the mobile terminal 110 in the vicinity of point in time t0, has expired. Then, the mobile terminal 110 may measure RSRP, or RSRQ to the first radio network node 120, updates its lower layer processes, due to hardware limitations, synchronizes with the second radio network node 130, reads information about second radio network node 130 from the broadcast channel of the second radio network node 130 during period of time T1. T301 as specified by TS 36.331 v8.4.0, where it is defined that this timer Td starts after the reception of the Radio Resource Connection (RRC) Configuration Reestablishment Request message at the radio network node 120, 130. It defines the time duration within which the radio communication system 100 may respond to this request by transmitting the RRC Configuration Reestablishment Complete.

Figure 4:
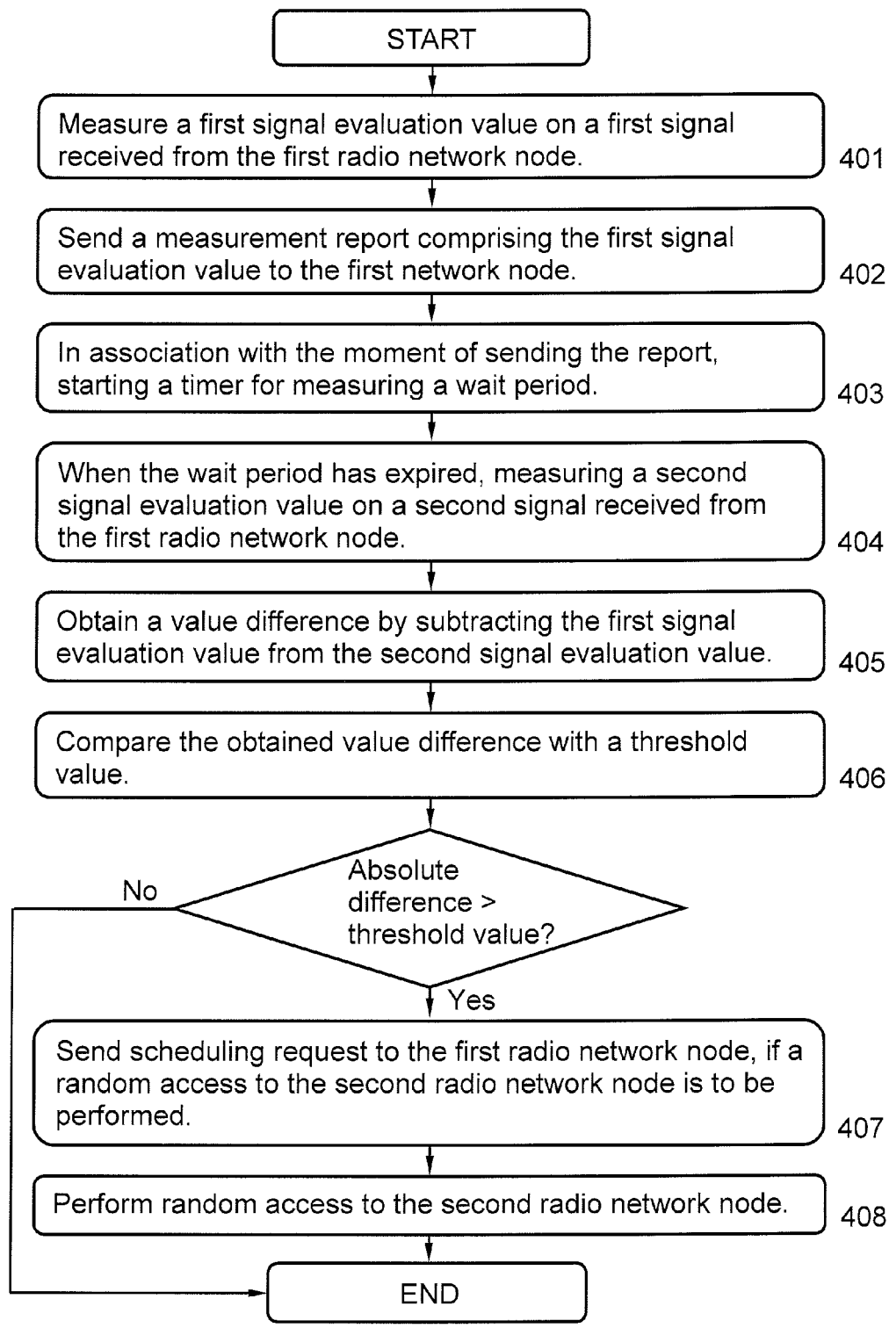
FIG. 4 is a schematic flow chart of an embodiment of the method in the mobile terminal.

FIG. 4 is a flow chart illustrating a method in a mobile terminal 110. The method aims at performing handover from a first radio network node 120 to a second radio network node 130 in a radio communication system 100. The radio communication system 100 comprises the mobile terminal 110, the first radio network node 120 and the second radio network node 130.

To appropriately perform a handover of the mobile terminal 110, the method in the mobile terminal 110 may comprise a number of steps 401-408. It is however to be noted that some of the described method steps are optional and only comprised within some embodiments. Further, it is to be noted that the method steps 401-408 may be performed in any arbitrary chronological order and that some of them, e.g. step 402 and step 403, or even all steps may be performed simultaneously or in an altered, arbitrarily rearranged, decomposed or even completely reversed chronological order. The method may comprise the following steps:

Step 401

A first signal evaluation value is measured on a first signal received from the first radio network node 120.

The first signal evaluation value may comprise any of Reference Signal Received Power (RSRP) or Reference Signal Received Quality (RSRQ), according to some embodiments.

Step 402

A measurement report comprising the first signal evaluation value is sent to the first network node 120.

Step 403

In association with the moment of sending 402 the measurement report, a timer for measuring a wait period is started. The timer is thus adapted to measure or count the passed time.

The value of the wait period may optionally be received from the first radio network node 120, according to some embodiments. However, the wait period may be predetermined, according to some embodiments.

Thus the first radio network node 120 may send the wait period to the mobile terminal 110. In this manner, both the mobile terminal 110 and the first radio network node 120 may be configured with the value of the wait period. Thereby, allowing the first radio network node 120 to respond to absence of response from the mobile terminal 110, when the mobile terminal 110 has performed autonomous handover.

The value of the wait period may be set to a multiple of the measurement period, according to some embodiments. Typical values of measurement periods used by various mobile phone vendors may be 40, 50 and/or 66.66 ms. Thus the wait period p may be set to:

$$p = n \cdot t$$

where n is an arbitrary integer ≥0 and t is the length of the measurement period, e.g. 40 ms, 50 ms and/or 66.66 ms. According to some embodiments, the wait period may be set to 1 or 2 times a measurement period comprised in the group: 40 ms, 50 ms and/or 66.66 ms.

Step 404

When the wait period has expired, a second signal evaluation value on a second signal received from the first radio network node 120 is measured.

The second signal evaluation value may comprise any of Reference Signal Received Power (RSRP) or Reference Signal Received Quality (RSRQ).

Step 405

A signal evaluation value difference is obtained by subtracting the first signal evaluation value from the second signal evaluation value.

Step 406

The obtained signal evaluation value difference is compared with a threshold value.

The threshold value may optionally be determined based on at least one value of a handover hysteresis value or the speed of the mobile terminal 110.

In some embodiments of the mobile terminal method, the mobile terminal 110 only performs handover to the second radio network node 130, if there has been a drop in RSRP, or RSRQ, or the like when comparing RSRP, RSRQ, or the like of the measurement report and the RSRP, RSRQ, or the like measured at expiry of the wait period.

Step 407

This step is optional and may only be comprised within some embodiments.

A scheduling request may be sent to the first radio network node 120, if a random access to the second radio network node 130 is to be performed.

Step 408

A random access to the second radio network node 130 is performed if the signal evaluation value difference is smaller than the threshold value.

In some embodiments of the present mobile terminal method, the mobile terminal 110 may send information about the fact that the mobile terminal 110 may on its own determine when to perform handover. In this manner, the network may respond to situations which occur due to autonomous handover of the mobile terminal 110.

Figure 5:
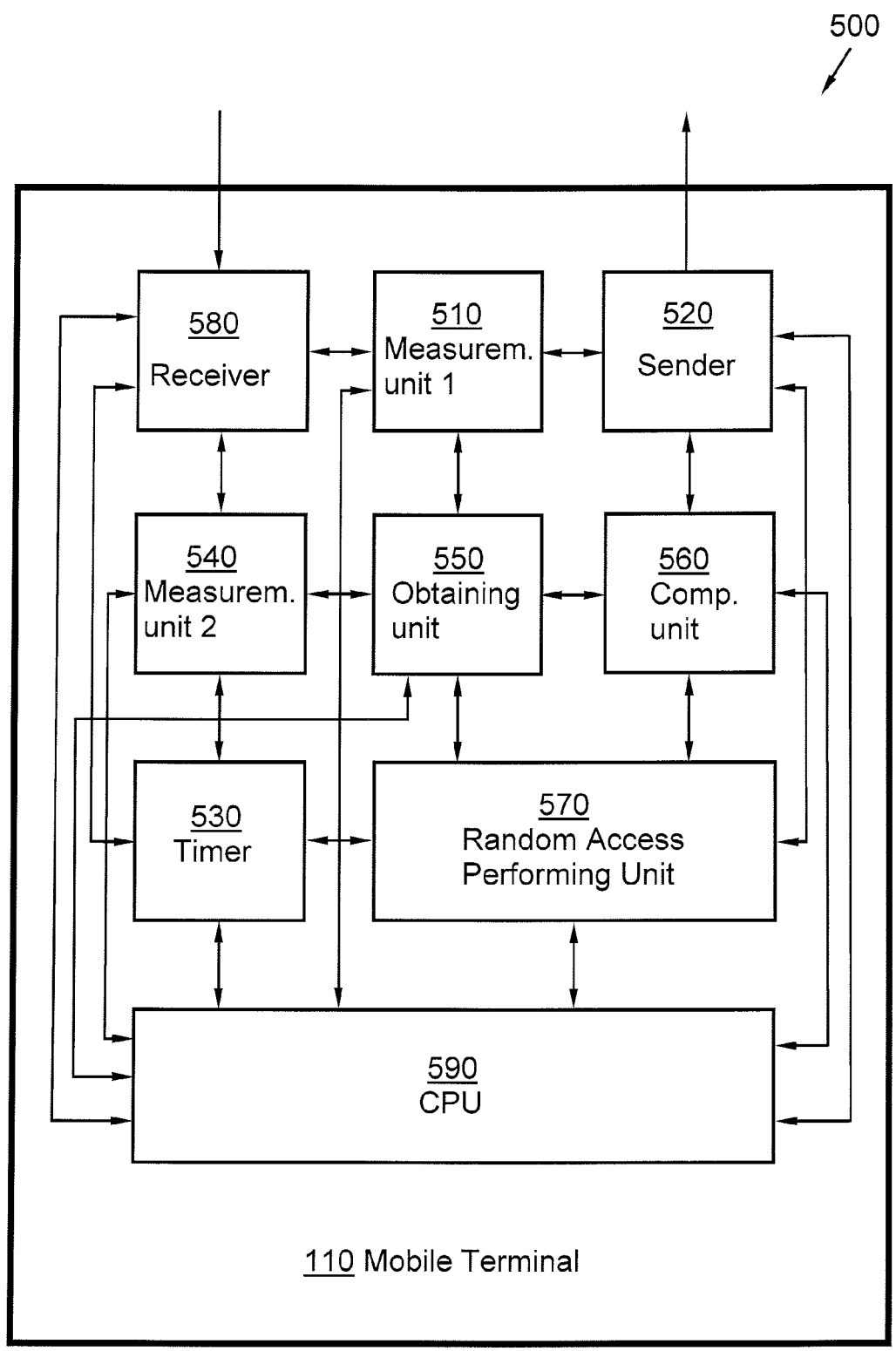
FIG. 5 is a schematic block diagram of an embodiment of the arrangement in the mobile terminal.

FIG. 5 is a block diagram illustrating embodiments of an arrangement 500 situated in a mobile terminal 110. The arrangement 500 is configured to perform the method steps 401-408 for performing handover from a first radio network node 120 to a second radio network node 130. The radio communication system 100 comprises the mobile terminal 110, the first radio network node 120 and the second radio network node 130.

For the sake of clarity, any internal electronics of the arrangement 500, not completely indispensable for understanding the present solution has been omitted from FIG. 5.

The arrangement 500 comprises a first measurement unit 510. The first measurement unit 510 is adapted to measure a first signal evaluation value on a first signal received from the first radio network node 120. Also, the arrangement 500 comprises a sender 520. The sender 520 is adapted to send a measurement report comprising the first signal evaluation value to the first network node 120. Optionally, the sender 520 may further be configured to send to the first radio network node information about the fact that the mobile terminal 110 has performed autonomous handover by leaving the first radio network node 120 and to send a handover confirm message to the second radio network node 130, according to some embodiments.

Further, the arrangement 500 comprises a timer 530. The timer 530 is adapted to measure a wait period. In addition, the arrangement 500 comprises a second measurement unit 540. The second measurement unit 540 is adapted to measure a second signal evaluation value on a second signal received from the first radio network node 120. Also, the arrangement 500 further comprises an obtaining unit 550. The obtaining unit 550 is adapted to obtain a signal evaluation value difference by subtracting the first signal evaluation value from the second signal evaluation value. Additionally, the arrangement 500 also comprises a comparison unit 560. The comparison unit 560 is adapted to compare the obtained signal evaluation value difference with a predetermined threshold value. In further addition, the arrangement 500 also comprises a random access performing unit 570. The random access performing unit 570 is adapted to perform random access to the second radio network node 130.

Also, the arrangement 500 may optionally, according to some embodiments, comprise a receiver 580. The optional receiver 580 may be adapted to receive radio signals.

The arrangement 500 may according to some embodiments comprise a processing unit 590. The processing unit 590 may be represented by e.g. a Central Processing Unit (CPU), a processor, a microprocessor, or other processing logic that may interpret and execute instructions. The processing unit 590 may perform all data processing functions for inputting, outputting, and processing of data including data buffering and device control functions, such as call processing control, user interface control, or the like.

It is to be noted that the described units 510-590 comprised within the arrangement 500 may be regarded as separate logical entities, but not with necessity as separate physical entities. Any, some or all of the units 510-590 may be comprised or co-arranged within the same physical unit. However, in order to facilitate the understanding of the functionality of the arrangement 500, the comprised units 510-590 are illustrated as separate physical units in FIG. 5.

Thus the sender 520 and e.g. the receiver 580 may, according to some embodiments, be comprised within one physical unit, a transceiver, which may comprise a transmitter circuit and a receiver circuit, which respectively transmits outgoing radio frequency signals to the mobile terminals 110 and receives incoming radio frequency signals from the mobile terminals 110 via an optional antenna.

The method steps 401-408 in the mobile terminal 110 may be implemented through one or more processing units 590 in the mobile terminal 110, together with computer program code for performing the functions of the present method steps 401-408. Thus a computer program product, comprising instructions for performing the method steps 401-408 in the mobile terminal 110 may perform the described method for performing handover from a first radio network node 120 to a second radio network node 130 in a radio communication system 100, when being loaded into the processing unit 590 in the mobile terminal 110.

The computer program product mentioned above may be provided for instance in the form of a data carrier carrying computer program code for performing the method steps 401-408 according to the present solution when being loaded into the processing unit 590. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the mobile terminal 110 remotely.

Figure 6:
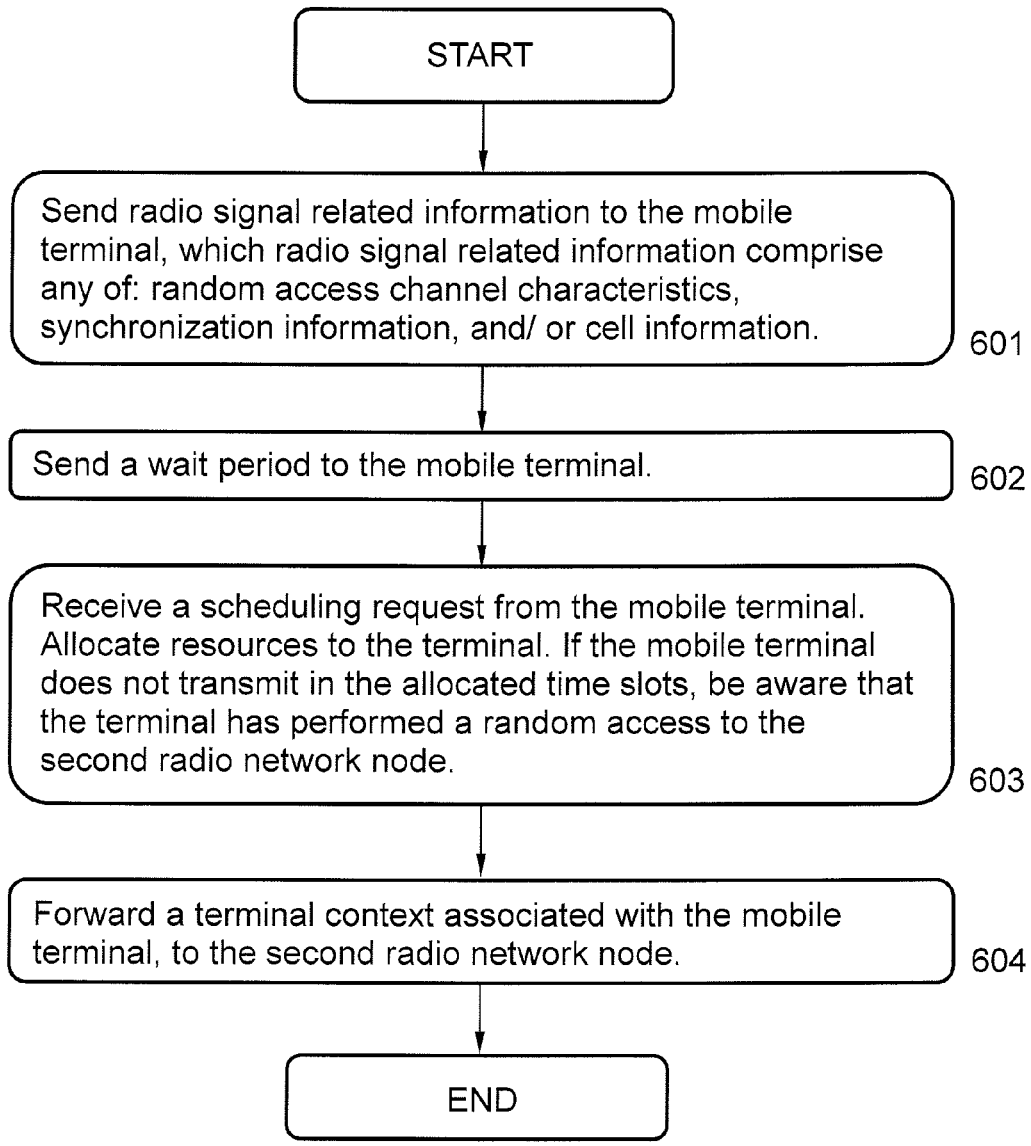
FIG. 6 is a schematic flow chart of an embodiment of the method in the first radio network node.

FIG. 6 is a flow chart illustrating a method in a first radio network node 120 for assisting a mobile terminal 110 in performing handover from the first radio network node 120 to a second radio network node 130. The mobile terminal 110, the first radio network node 120 and the second radio network node 130 are comprised in a radio communication system 100.

In some embodiments of the present method in the first radio network node 120, the first radio network node 120 may send information about parameters required for synchronization when the mobile terminal 110 enters or switches to non-synchronized radio network nodes or nodes with other frequencies. In this manner, the mobile terminal 110 synchronizes faster to the second radio network node 130, in case the mobile terminal 110 performs, or attempts to perform, an autonomous handover procedure.

To appropriately assisting the mobile terminal 110 in performing handover from the first radio network node 120 to a second radio network node 130, the method in the first radio network node 120 may comprise a number of steps 601-604. It is however to be noted that some of the described method steps 601-604 are optional and only comprised within some embodiments. Further, it is to be noted that the method steps 601-604 may be performed in any arbitrary chronological order and that some of them, e.g. step 601 and step 602, or even all steps may be performed simultaneously or in an altered, arbitrarily rearranged, decomposed or even completely reversed chronological order. The method may comprise the following steps:

Step 601

Radio signal related information is sent to the mobile terminal 110. The sent radio signal related information comprises any of: random access channel characteristics, synchronization information, and/or cell information.

Step 602

A wait period is sent to the mobile terminal 110.

The value of the wait period may be set to a multiple of the measurement period, according to some embodiments. Typical values of measurement periods used by various mobile phone vendors may be 40, 50 and/or 66.66 ms. Thus the wait period p may be set to:

$$p = n \cdot t$$

where n is an arbitrary integer $\geq 0$ and t is the length of the measurement period, e.g. 40 ms, 50 ms and/or 66.66 ms. According to some embodiments, the wait period may be set to 1 or 2 times a measurement period comprised in the group: 40 ms, 50 ms and/or 66.66 ms.

Step 603

A scheduling request is received from the mobile terminal 110, if the mobile terminal 110 has detected a difference in RSRP or RSRQ values of the serving node higher than a predefined threshold, at the expiry of timer, td.

Thus, according to some embodiments, resources may be allocated to the mobile terminal 110. However, if the mobile terminal 110 does not transmit in the allocated time slots, the mobile terminal 110 may have performed a random access to the second radio network node 130.

Step 604

Terminal context associated with the mobile terminal 110 is forwarded to the second radio network node 130.

In some embodiments of the first radio network node method, the first radio network node 120 may send, or forward, the terminal context to neighbouring radio network nodes, such as the second radio network node 130. Terminal context may be the list of all the configuration parameters for physical layer, transport channels, MAC, RLC, PDCP RLC and PDCP buffers content and any other radio bearer parameter. In this manner, the connection establishment of the mobile terminal 110 to the second radio network 130 may be performed with less delay, since the terminal context is already available in the second radio network node 130. Hence, this second radio network 130 does not need to fetch the terminal context from the first network node 120. In other embodiments of the method in the first radio network node, the first radio network node 120 receives terminal context from a neighbouring radio network node 130.

In some embodiments of the present method, the first radio network node 120 may send, or forward, the terminal context to neighbouring radio network nodes 130 upon reception of a measurement report from the mobile terminal 110. The measurement report may indicate the event of triggering handover to a target node 130, or it may simply indicate a number of neighbour nodes 130 which are received with good quality and which might be potential target nodes for handover.

In some embodiments of the method in the first radio network node 120, the first radio network node 120 may broadcast or send information e.g. in an information element, about parameters of at least one of the neighbouring radio network nodes, such as the second radio network node 130, to the mobile terminal 110. The parameters may be RACH parameters, synchronization channel parameters, physical layer cell identity parameters. Further, the RACH parameter comprises one or more of number of RACH preambles, number of preambles groups, preambles sizes, power ramping parameters, response window time and Content Resolution Timer. The parameters may be used by the mobile terminal 110 for initiating communication with any second radio network node 130. For example, RACH parameters depending on the cell are the RACH frequency, i.e. how often the RACH channel is transmitted in the cell, the RACH preamble size used, and the like. In this manner, the mobile terminal 110 may switch to the second radio network node 130, such as a target base station, faster. RACH parameters may be one or more of number of RACH preambles, number of preambles groups, preambles sizes, power ramping parameters, response window time, Content Resolution Timer or Radio resource control information elements. The information element identifies the contents of a Radio resource control message.

Figure 7:
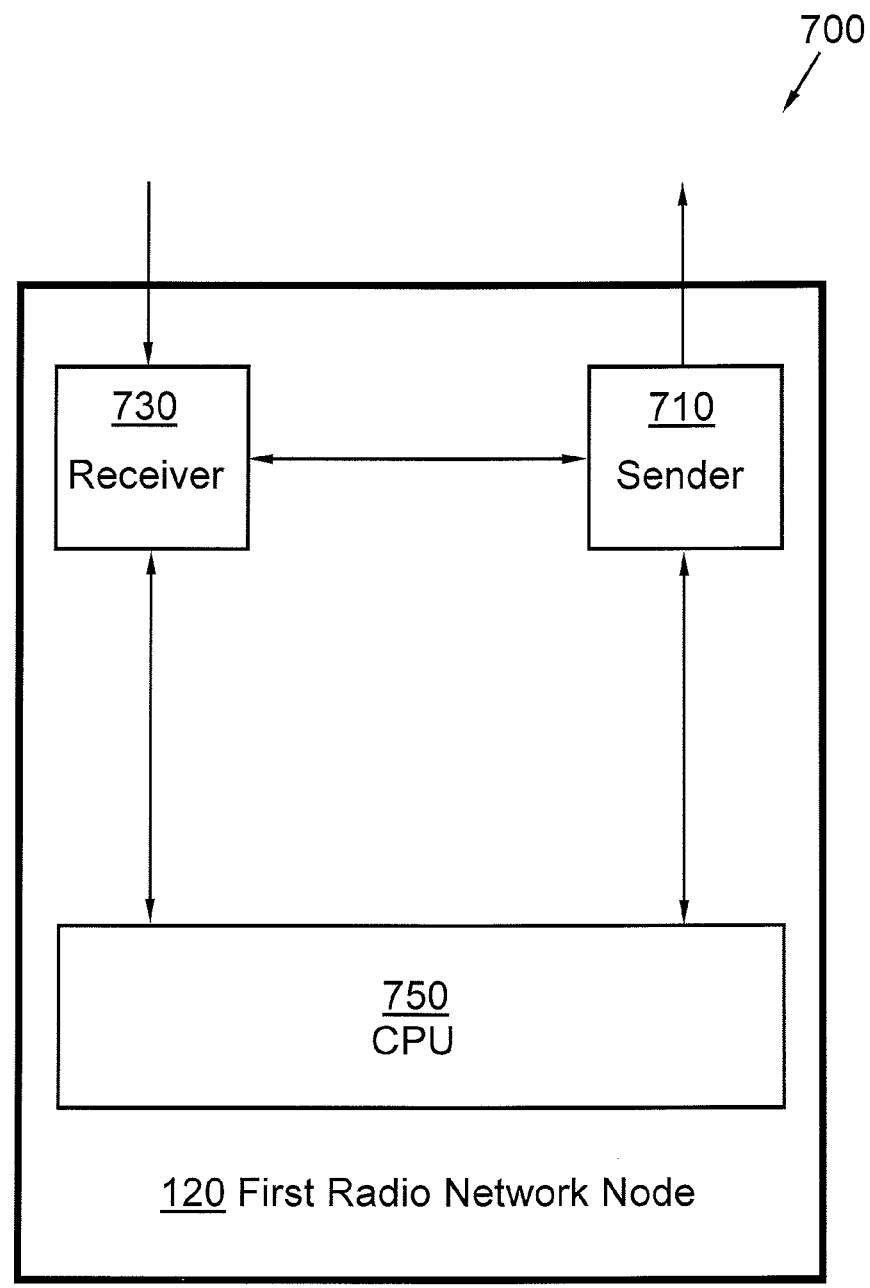
FIG. 7 is a schematic block diagram of an embodiment of the arrangement in the first radio network node.

FIG. 7 is a block diagram illustrating embodiments of an arrangement 700 situated in a first radio network node 120. The arrangement 700 is configured to perform the method steps 601-604 for assisting a mobile terminal 110 in performing handover from the first radio network node 120 to a second radio network node 130. The mobile terminal 110, the first radio network node 120 and the second radio network node 130 are comprised in a radio communication system 100.

For the sake of clarity, any internal electronics of the arrangement 700, not completely indispensable for understanding the present solution has been omitted from FIG. 7.

The arrangement 700 comprises a sender 710. The sender 710 is adapted to send radio signal related information to the mobile terminal 110. The radio signal related information comprises any of: random access channel characteristics, synchronization information, and/or cell information.

Also, the arrangement 700 optionally may comprise a receiver 730, adapted to receive radio signals.

The arrangement 700 may according to some embodiments comprise a processing unit 750. The processing unit 750 may be represented by e.g. a Central Processing Unit (CPU), a processor, a microprocessor, or other processing logic that may interpret and execute instructions. The processing unit 750 may perform all data processing functions for inputting, outputting, and processing of data including data buffering and device control functions, such as call processing control, user interface control, or the like.

It is to be noted that the described units 710-750 comprised within the arrangement 700 may be regarded as separate logical entities, but not with necessity as separate physical entities. Any, some or all of the units 710-750 may be comprised or co-arranged within the same physical unit. However, in order to facilitate the understanding of the functionality of the arrangement 700, the comprised units 710-750 are illustrated as separate physical units in FIG. 7.

Thus the sender 710 and e.g. the receiver 730 may, according to some embodiments, be comprised within one physical unit, a transceiver, which may comprise a transmitter circuit and a receiver circuit, which respectively transmits outgoing radio frequency signals to e.g. the mobile terminal 110 and receives incoming radio frequency signals from e.g. the mobile terminal 110 via an optional antenna.

The method steps 601-604 in the first radio network node 120 may be implemented through one or more processing units 750 in the first radio network node 120, together with computer program code for performing the functions of the present method steps 601-604. Thus a computer program product, comprising instructions for performing the method steps 601-604 in the first radio network node 120 may perform the described method for assisting a mobile terminal 110 in performing handover from a first radio network node 120 to a second radio network node 130 in a radio communication system 100, when being loaded into the processing unit 750 in the first radio network node 120.

The computer program product mentioned above may be provided for instance in the form of a data carrier carrying computer program code for performing the method steps 601-604 according to the present solution when being loaded into the processing unit 750. The data carrier may be e.g. a hard disk, a CD ROM disc, a memory stick, an optical storage device, a magnetic storage device or any other appropriate medium such as a disk or tape that can hold machine readable data. The computer program product may furthermore be provided as computer program code on a server and downloaded to the first radio network node 120 remotely.

The terminology used in the detailed description of the particular exemplary embodiments illustrated in the accompanying drawings is not intended to be limiting of the invention.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

The invention claimed is:

1. A Method in a mobile terminal for performing handover from a first radio network node to a second radio network node in a radio communication system, wherein the radio communication system comprises the mobile terminal, the first radio network node and the second radio network node, the method comprising the steps of:
measuring a first signal evaluation value on a first signal received from the first radio network node,
sending a measurement report comprising the first signal evaluation value to the first network node,
in association with the moment of sending the measurement report, starting a timer for measuring a wait period,
when the wait period has expired, measuring a second signal evaluation value on a second signal received from the first radio network node,
obtaining a signal evaluation value difference by subtracting the first signal evaluation value from the second signal evaluation value,
comparing the obtained signal evaluation value difference with a threshold value,
if the signal evaluation value absolute difference is higher than the threshold value, performing random access to the second radio network node; and
sending a scheduling request to the first radio network node, if a random access to the second radio network node is to be performed.

2. The method according to claim 1, wherein the first and second signal evaluation values comprises any of Reference Signal Received Power (RSRP) or Reference Signal Received Quality (RSRQ).

3. The method according to claim 1, wherein the value of the wait period is received from the first radio network node.

4. The method according to claim 1, wherein the value of the wait period is set to a multiple of a measurement period used by the mobile terminal.

5. The method according to claim 1, wherein the value of the wait period is set to 1 or 2 times a measurement period comprised in the group: 40 ms, 50 ms or 66.66 ms.

6. The method according to claim 1, wherein the threshold value is determined based on at least one value of a handover hysteresis value and the speed of the mobile terminal.

7. An arrangement in a mobile terminal for performing handover from a first radio network node to a second radio network node in a radio communication system, wherein the radio communication system comprises the mobile terminal, the first radio network node and the second radio network node, the arrangement comprising:
a first measurement unit, adapted to measure a first signal evaluation value on a first signal received from the first radio network node,
a sending unit, adapted to send a measurement report comprising the first signal evaluation value to the first network node,
a timer, adapted to measure a wait period,
a second measurement unit, adapted to measure a second signal evaluation value on a second signal received from the first radio network node,
an obtaining unit, adapted to obtain a signal evaluation value difference by subtracting the first signal evaluation value from the second signal evaluation value,
a comparison unit, adapted to compare the obtained signal evaluation value difference with a predetermined threshold value,
a random access performing unit, adapted to perform random access to the second radio network node; and
the sending unit further adapted to send a scheduling request to the first radio network node, if a random access to the second radio network node is to be performed.

8. A method in a first radio network node for assisting a mobile terminal in performing handover from the first radio network node to a second radio network node in a radio communication system, wherein the radio communication system comprises the mobile terminal, the first radio network node and the second radio network node, the method comprising the steps of:
sending radio signal related information to the mobile terminal, which radio signal related information comprises one or more of:
random access channel characteristics, synchronization information, and cell information;
sending a wait period to the mobile terminal, wherein the value of the wait period is set to a multiple of a measurement period used by the mobile terminal; and
receiving a scheduling request from the mobile terminal, if the mobile terminal is going to perform a random access to the second radio network node.

9. The method according to claim 8, wherein the value of the wait period is set to 1 or 2 times a measurement period comprised in the group: 40 ms, 50 ms or 66.66 ms.

10. The method according to claim 8, wherein the method comprises the further step of:
forwarding a terminal context associated with the mobile terminal, to the second radio network node.

11. An arrangement in a first radio network node for assisting a mobile terminal for performing handover from the first radio network node to a second radio network node in a radio communication system, wherein the radio communication system comprises the mobile terminal, the first radio network node and the second radio network node, the arrangement comprising:
a sender, adapted to send radio signal related information to the mobile terminal, which radio signal related information comprises one or more of:
random access channel characteristics, synchronization information, and cell information;
the sender further adapted to send a wait period to the mobile terminal, wherein the value of the wait period is set to a multiple of a measurement period used by the mobile terminal; and
a receiver adapted to receive a scheduling request from the mobile terminal, if the mobile terminal is going to perform a random access to the second radio network node.

* * * * *